(12) United States Patent
Zhou et al.

(10) Patent No.: US 10,655,813 B2
(45) Date of Patent: May 19, 2020

(54) OPTICAL INDICATING DEVICE, VEHICLE LAMP AND MOTOR VEHICLE

(71) Applicant: VALEO VISION, Bobigny (FR)

(72) Inventors: Haiqing Zhou, Wuhan (CN); Long Wang, Wuhan (CN); Ji Luo, Wuhan (CN); Ciling Zhang, Wuhan (CN); Pingwu Yang, Wuhan (CN)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/125,380

(22) Filed: Sep. 7, 2018

(65) Prior Publication Data

US 2019/0078750 A1 Mar. 14, 2019

(30) Foreign Application Priority Data

Sep. 8, 2017 (CN) .......................... 2017 1 0811207

(51) Int. Cl.
| | |
|---|---|
| *F21S 43/20* | (2018.01) |
| *F21V 23/00* | (2015.01) |
| *F21V 14/06* | (2006.01) |
| *F21S 41/275* | (2018.01) |
| *F21S 43/14* | (2018.01) |
| *F21V 5/00* | (2018.01) |
| *F21S 41/663* | (2018.01) |
| *F21S 41/20* | (2018.01) |

(52) U.S. Cl.
CPC .............. *F21S 43/26* (2018.01); *F21S 41/275* (2018.01); *F21S 41/28* (2018.01); *F21S 41/285* (2018.01); *F21S 41/663* (2018.01); *F21S 43/14* (2018.01); *F21V 5/004* (2013.01); *F21V 5/005* (2013.01); *F21V 14/06* (2013.01); *F21V 23/003* (2013.01); *B60Q 2400/50* (2013.01)

(58) Field of Classification Search
CPC .......... B60Q 1/06; B60Q 1/34; B60Q 1/0047; B60Q 2400/50; F21S 41/275; F21S 41/28; F21S 41/285; F21S 41/663; F21S 43/14; F21S 43/26; F21S 41/635; F21S 41/657; F21V 14/06; F21V 23/003; F21V 5/004; F21V 5/005
See application file for complete search history.

(56) References Cited

U.S. PATENT DOCUMENTS

| | | | | |
|---|---|---|---|---|
| 9,423,092 | B1* | 8/2016 | Deyaf | ................... F21S 41/143 |
| 10,006,600 | B2* | 6/2018 | Jo | ...................... G02B 27/2214 |
| 10,024,517 | B2* | 7/2018 | Miyashita | ............... F21V 5/002 |
| 2008/0130309 | A1* | 6/2008 | Condon | ................... B60Q 1/34 |
| | | | | 362/520 |

(Continued)

*Primary Examiner* — Peggy A Neils
(74) *Attorney, Agent, or Firm* — Oblon, McClelland, Maier & Neustadt, L.L.P.

(57) ABSTRACT

An optical indicating device, a vehicle lamp including the optical indicating device, and a motor vehicle are provided. The optical indicating device includes: at least one light source emitting a light beam; and a patterning device arranged to form an indicating pattern when a light beam emitted from the light source is transmitted through the patterning device; the patterning device includes an patterning unit arranged to pattern the light beam, and a plurality of light deflecting portions arranged adjacent to each other are formed on a side of the patterning unit facing towards the light source or facing away from the light source.

20 Claims, 11 Drawing Sheets

(56) References Cited

U.S. PATENT DOCUMENTS

| | | | | |
|---|---|---|---|---|
| 2015/0321598 A1* | 11/2015 | Kanayama | ............... | F21S 41/19 |
| | | | | 362/487 |
| 2016/0320627 A1* | 11/2016 | Chen | ................... | G02B 27/425 |
| 2017/0166111 A1* | 6/2017 | Baccarin | ................ | F21S 43/13 |
| 2017/0211772 A1* | 7/2017 | Wu | ....................... | F21S 41/336 |
| 2017/0349095 A1* | 12/2017 | Wimmer | ................ | F21V 5/005 |

\* cited by examiner

OPTICAL INDICATING DEVICE, VEHICLE LAMP AND MOTOR VEHICLE

BACKGROUND

Technical Field

The present disclosure relates to the field of lighting and signaling, and in particular, to an optical indicating device, a vehicle lamp including the optical indicating device, and a motor vehicle.

Description of the Related Art

With technical development and social progress, requirements of the people on a lighting or signaling device have gone beyond the function of providing illumination or signal indicator. Thus, customized requirements for the lighting or signaling device (for example a vehicle lamp for a motor vehicle) increase and it may be desired to provide more diverse patterns and lit effects of light beams. For example, it may be desired that the illumination light or signaling light includes certain information or patterns to meet the customized requirements. The prior art has proposed devices for generating patterns in the lighting or signaling device, for example, generating patterns by shielding light beams partly with opaque materials. However, such shielding with opaque materials may cause loss of optical efficiency.

SUMMARY

An object of the present disclosure is to provide an optical indicating device that can generate an optical indicating pattern with a sample structure and high efficiency.

The present disclosure provides an optical indicating device including: at least one light source; and a patterning device arranged to form an indicating pattern when a light beam emitted from the light source is transmitted through the patterning device; the patterning device includes at least one patterning unit arranged to pattern the light beam, and a plurality of light deflecting portions arranged adjacent to each other are formed on a side of the patterning unit facing towards the light source or facing away from the light source.

Preferably, the light deflecting portions have cross sections with circular arc-shaped profiles or triangular profiles. In an embodiment, the light deflecting portions have widths less than 5 mm and greater than 0.01 mm, preferably, the light deflecting portions have widths less than 5 mm and greater than 0.1 mm. However, it should be noted that any other profiles of cross sections that can achieve function of deflecting an incident light are applicable.

In an embodiment of the optical indicating device according to the present disclosure, the light deflecting portions of the patterning unit extend in different directions. The at least one patterning unit is combinable with each other, so as to show a desired pattern through combined patterning unit when the light beam emitted from the light source is transmitted through the patterning device. In particular, when the light deflecting portions of the patterning unit have a same extending direction, the costs for manufacturing and storing the patterning unit can be saved. Certainly, the patterning unit may also be made into one single piece. In this case, the light deflecting portions with desired extending directions are formed on a side of the patterning unit.

A distance between the light source and the patterning unit of the optical indicating device according to the present disclosure is adjustable. By means of changing the distance between the light source and the patterning unit, the indicating pattern outputted by the patterning device may be varied easily. In one example, the distance between a light source and the patterning unit may be different from the distance between another light source and the patterning unit. The larger the distance between the light source and the patterning unit is, the larger the size of the shown indicating pattern will be; otherwise, the smaller the distance between the light source and the patterning unit is, the smaller the size of the shown indicating pattern will be.

The optical indicating device according to the present disclosure may further include a pattern adjusting device configured to control on and off of the at least one light source so as to change the indicating pattern outputted by the patterning device. In an example, light sources may be divided into groups. A group of light sources may emit corresponding light beams and the pattern adjusting device may control on and off of the groups of light sources so as to change the indicating pattern(s) outputted by the patterning device. In order to control the light source(s), the pattern adjusting device includes a driving circuit configured to control a driving current passing through the at least one light source.

In an embodiment of the optical indicating device according to the present disclosure, the light source is constructed as a light emitting diode or a halogen lamp.

In an embodiment of the optical indicating device according to the present disclosure, the patterning unit is formed by a grating.

The present disclosure also provides a vehicle lamp including the optical indicating device as described in any one of the above embodiments.

The present disclosure also provides a motor vehicle including the indicating device as described in any one of the above embodiments or the vehicle lamp as described in any one of the above embodiments.

The optical indicating device according to at least one of the above embodiments of the present disclosure can form various indicating patterns with relatively high optical efficiency, by means of patterning the light beam by a plurality of patterning units with a series of light deflecting portions extending in different directions.

DETAILED DESCRIPTION OF EMBODIMENTS

The technical solutions of the disclosure will be further explained in detail by way of examples, with reference to the accompanying drawings. In the specification, like or similar reference numbers indicate like or similar parts. The following description of embodiments of the present disclosure with reference to the accompanying drawings is intended to explain the general inventive concept of the present disclosure and should not be construed as limiting the present disclosure.

Further, in the following detailed description, numerous specific details are set forth in order to provide a thorough understanding of the embodiments of the present disclosure. It will be apparent, however, that one or more embodiments may also be practiced without these specific details.

Figure 1:
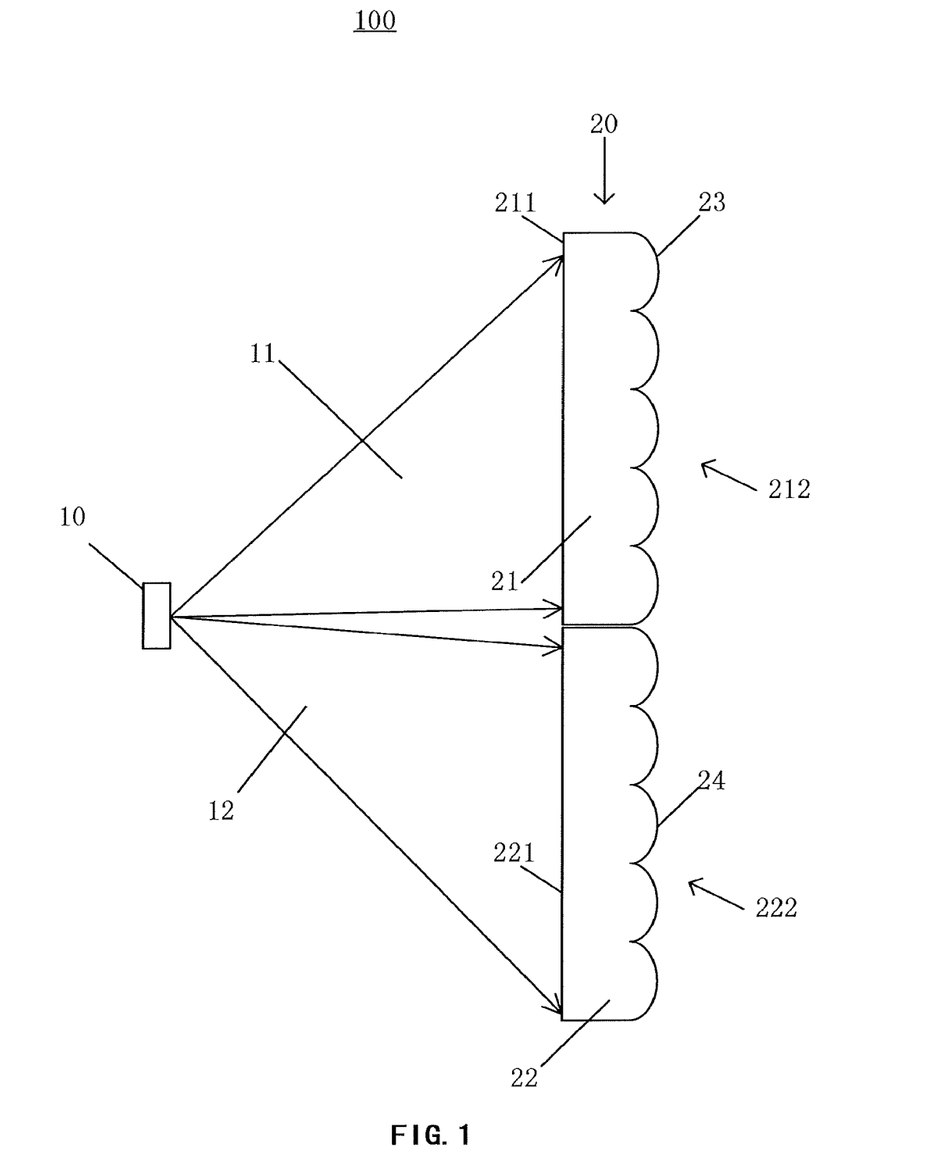
FIG. 1 shows a schematic view of an optical indicating device according to an embodiment of the present disclosure.

FIG. 1 schematically illustrates an optical indicating device 100, for a vehicle lamp, according to an embodiment of the present disclosure. The optical indicating device 100 may include: a light source 10 arranged to emit a first light beam 11 and a second light beam 12; and a patterning device 20 arranged to form indicating patterns in cross sections of the first light beam 11 and the second beam 12 emitted from the light source 10. The patterning device 20 may include: a first patterning unit 21 arranged to pattern the first light beam 11, the first patterning unit 21 comprising a plurality of first light deflecting portions 23 extending in parallel with one another and in a first direction x; and a second patterning unit 22 arranged to pattern the second light beam 12, the second patterning unit 22 including a plurality of second light deflecting portions 24 extending in parallel with one another and in a second direction y. The second direction y is different from the first direction x, for example, the second direction y may be inclined at an angle greater than 0 degree and less than 180 degrees with respect to the first direction x. The first light beam 11 refracted by the plurality of first light deflecting portions 23 and the second light beam 12 refracted by the plurality of second light deflecting portions 24 may be emitted from the vehicle lamp to form an illumination and/or signaling light beam.

Figure 8:
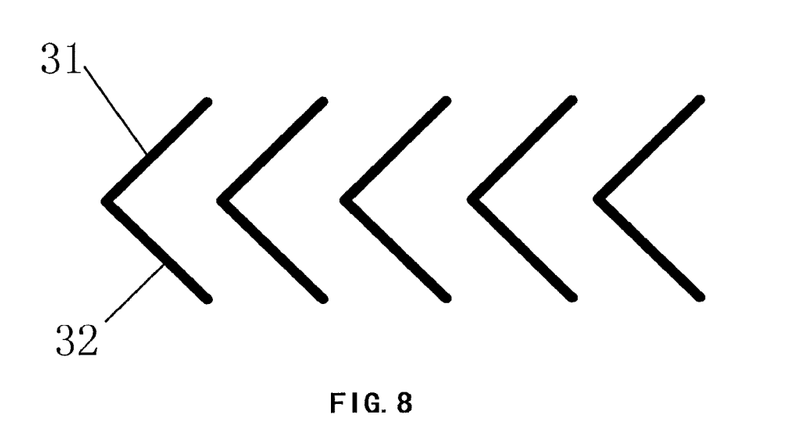
FIG. 8 shows a schematic view of an example of an indicating pattern outputted by an optical indicating device according to an embodiment of the present disclosure.

The optical indicating pattern may be generated by means of the patterning device 20 in the optical indicating device 100 according to an embodiment of the present disclosure. For example, when the light source 10 is a point light source (for example a light emitting diode or a halogen lamp), the light beam having passed through the patterning device 20 may form a pattern with a bright fold line (for example, any fold line shown in FIG. 8). When the light source 10 includes a column of point light sources, the light source 10 will emit a plurality of light beams and the light beams having passed through the patterning device 20 may form a pattern with a group of bright fold lines (for example, the pattern as shown in FIG. 8). The patterning device 20 forms a pattern by using the light deflecting portions thereof. It has a higher optical efficiency in comparison with a case where a pattern is formed directly using opaque shielding members.

There are at least a first light deflecting portion 23 and a second light deflecting portion 24 extending in two different directions respectively on the patterning device 20, thus the patterning device 20 can form relatively diverse indicating patterns, for example, a pattern with indicating information, such as a directional arrow or the like, may be formed.

Figure 1A:
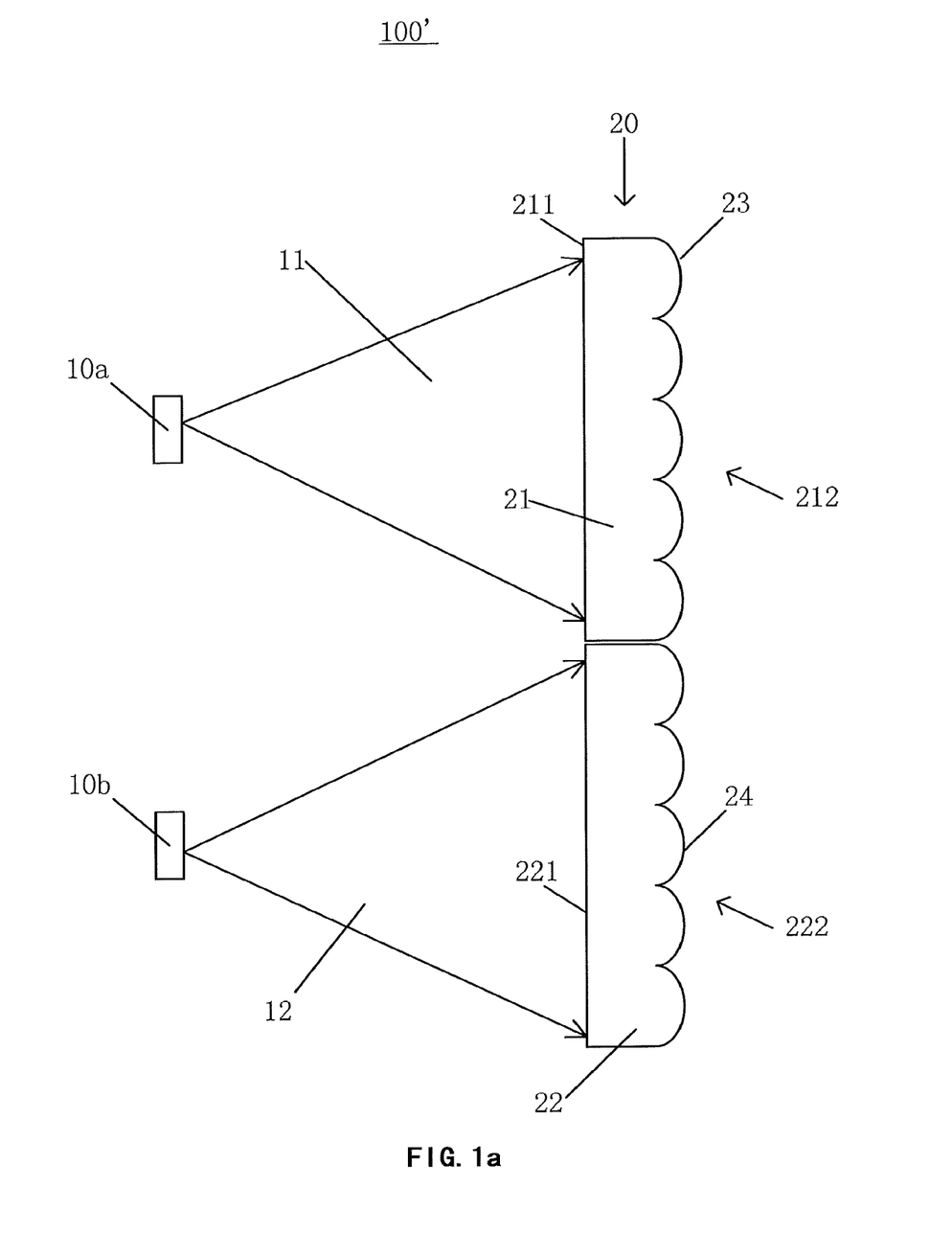
FIG. 1a shows a schematic view of an optical indicating device according to another embodiment of the present disclosure.

In the embodiment shown in FIG. 1, the first light beam 11 and the second light beam 12 are emitted from the same light source 10. It may reduce light source arrangement and keep consistency of the first light beam 11 and the second light beam 12. For example, the first light beam 11 may be formed by a part (an upper half part in FIG. 1) of a light beam emitted from a light source and the second light beam 12 may be formed by another part (a lower half part in FIG. 1) of the light beam emitted from the light source. FIG. 1a shows an optical indicating device 100' according to another embodiment of the present disclosure. In this embodiment, the optical indicating device 100' includes two or more light sources 10a, 10b and the first light beam 11 and the second light beam 12 are emitted from two light sources respectively. It is advantageous to arrange and adjust parameters (such as brightness) of various parts of the indicating patterns.

As an example, the optical indicating device may provide separate light sources for the first patterning unit 21 and the second patterning unit 22 respectively, or may alternatively provide a common light source for them.

Figure 2:
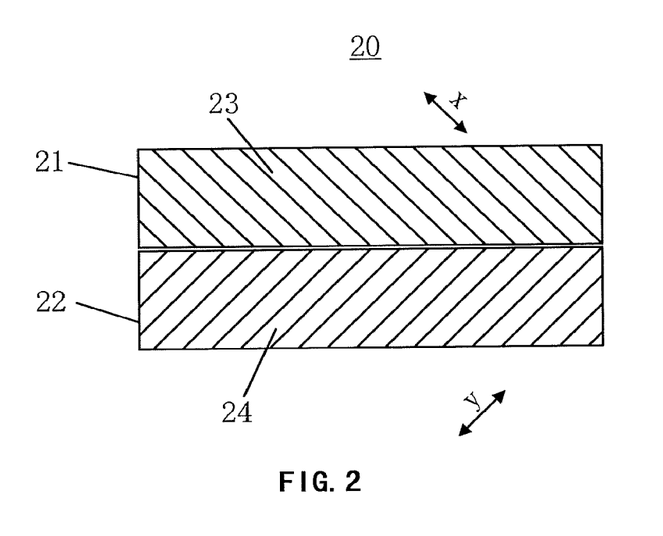
FIG. 2 shows a schematic view of an example of a patterning device in an optical indicating device according to an embodiment of the present disclosure.

In an example, the plurality of first light deflecting portions 23 may be arranged to adjoin with each other. Similarly, the plurality of second light deflecting portions 24 may also be arranged to adjoin with each other, as shown in FIG. 2. It may improve uniformity of intensity of the light beams emitted from the plurality of first light deflecting portions 23 and/or the plurality of second light deflecting portions 24. In an example, all of the first light deflecting portions 23 and/or the second light deflecting portions 24 may have the same size (including width, height, profile shape or the like). It is advantageous to form continuous and uniform patterns. However, in another example, for example, in order to form non-uniform pattern, the first light deflecting portions 23 and/or the second light deflecting portions 24 may have different sizes from each other, even a certain spacing may be arranged between adjacent first light deflecting portions 23 and/or between adjacent second light deflecting portions 24.

Figure 3:
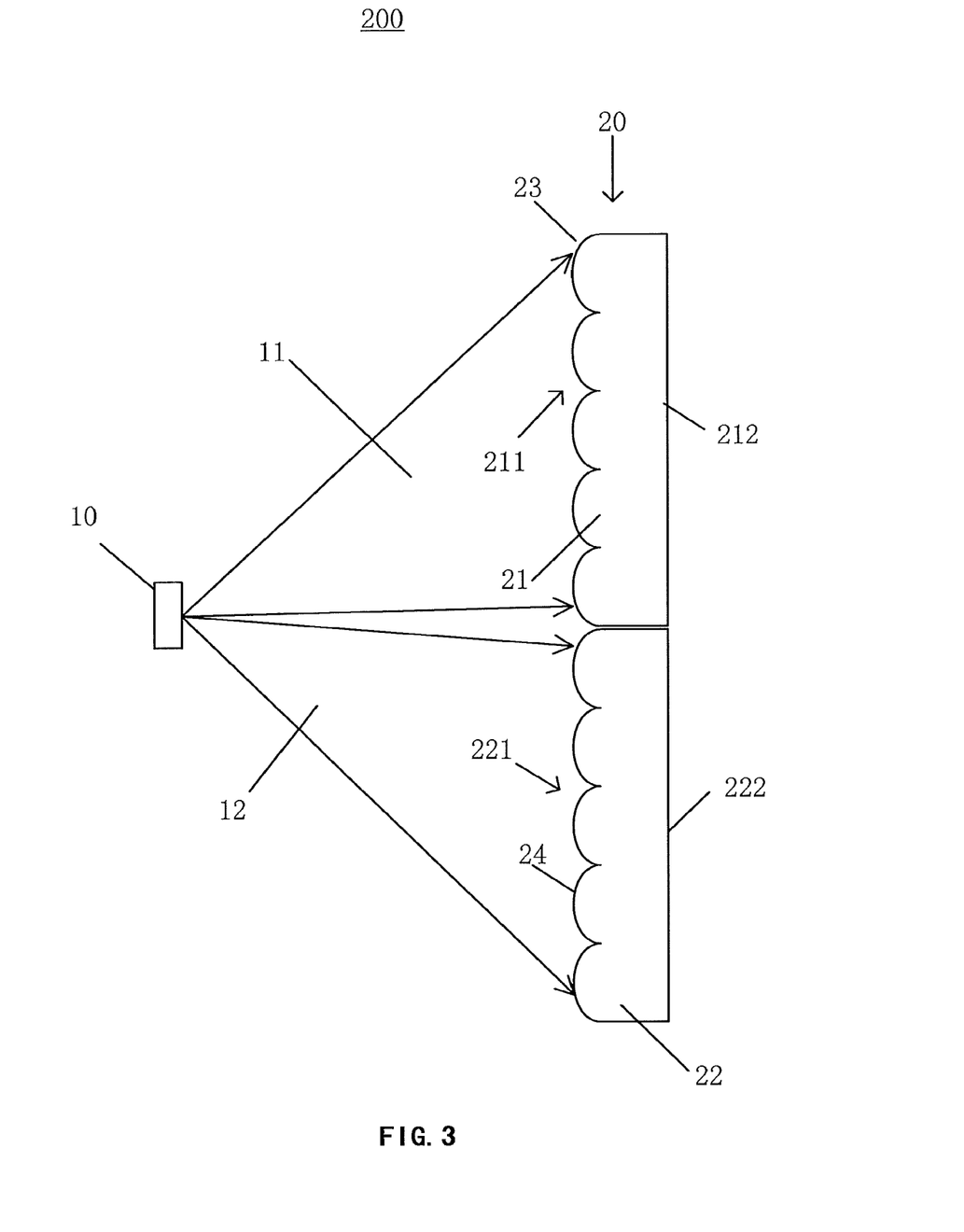
FIG. 3 shows a schematic view of an optical indicating device according to another embodiment of the present disclosure.

In an example, the first patterning unit 21 has a first surface 211 facing the light source 10 and a second surface 212 facing away from the light source 10. The plurality of first deflecting portions 23 may be arranged on the first surface 211 (as shown in FIG. 1), or may be arranged on the second surface 212 (as shown in FIG. 3). The first deflecting portions 23 may be located on the first surface 211 or the second surface 212. It is advantageous to form a deflecting face for the light beam.

Similarly, in an example, the second patterning unit 22 has a third surface 221 facing the light source 10 and a fourth surface 222 facing away from the light source 10 and the plurality of second deflecting portions 24 are arranged on the third surface 221 (as shown in FIG. 1) or the fourth surface 222 (as shown in FIG. 3). As an example, the first deflecting portions 23 and the second deflecting portions 24 may be arranged on a same side of the patterning device 20, or may be arranged on two opposite sides of the patterning device 20 respectively.

Figure 6:
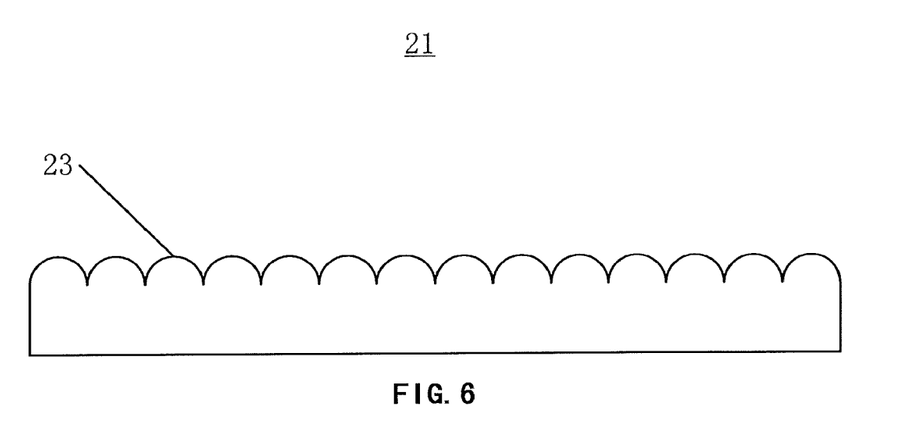
FIG. 6 shows a schematic view of an example of a cross sectional shape of a light deflecting portion in an optical indicating device according to an embodiment of the present disclosure.
Figure 7:
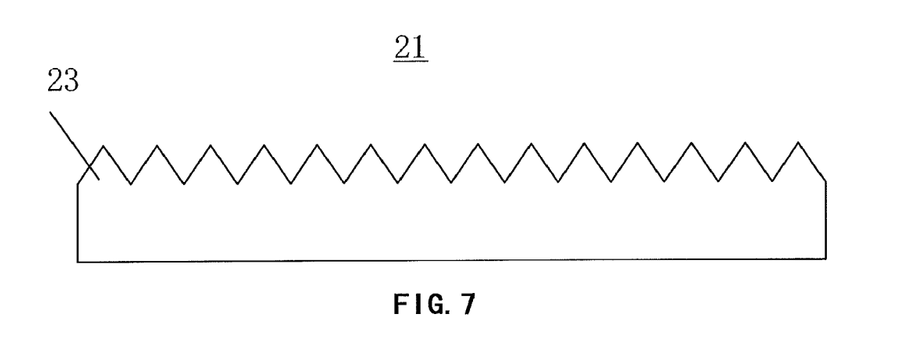
FIG. 7 shows a schematic view of another example of a cross sectional shape of a light deflecting portion in an optical indicating device according to an embodiment of the present disclosure.

As an example, the first light deflecting portions 23 and/or the second light deflecting portions 24 have cross sections which may have circular arc-shaped profiles (as shown in FIG. 6) or triangular profiles (as shown in FIG. 7), which is advantageous in that the first light deflecting portions 23 and/or the second light deflecting portions 24 deflect the light beam towards a side of the first patterning unit 21 and/or a side of the second patterning unit 22 facing away from the light source 10.

The work principle of the first deflecting portion 23 will be explained briefly below by taking the first deflecting portion 23 with a cross section having a circular arc-shaped profile as an example.

Figure 12:
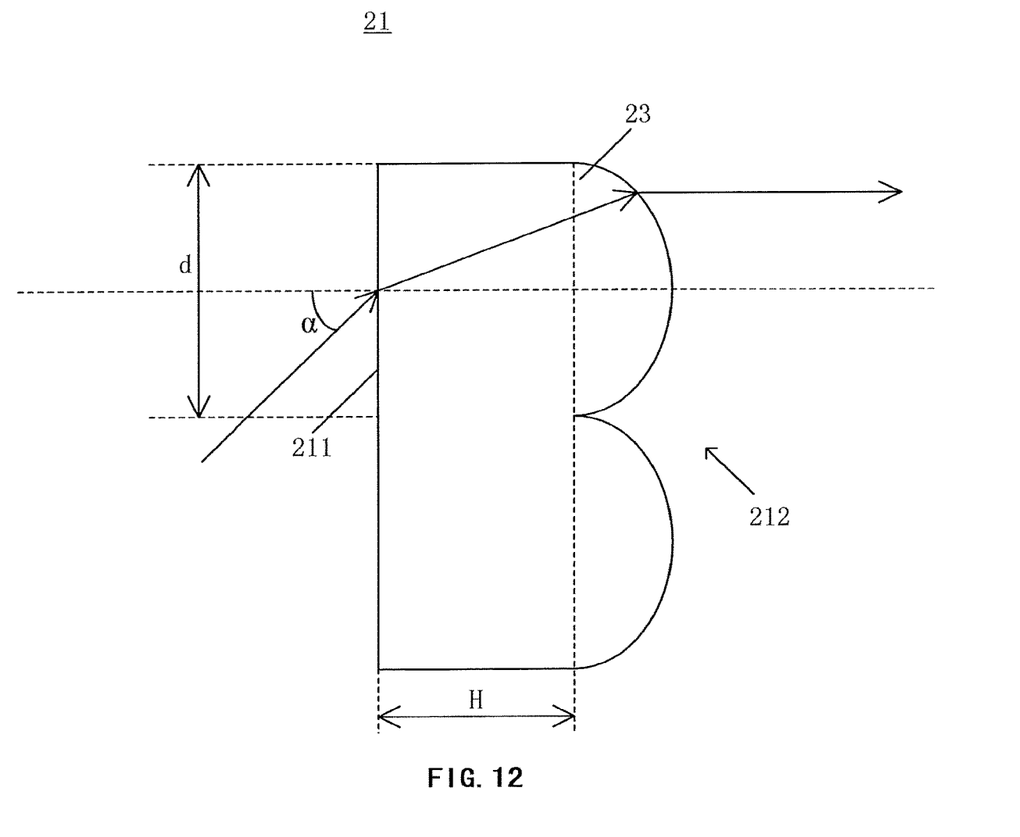
FIG. 12 shows schematically work principle of a first or second light deflecting portion.

FIG. 12 is a schematic view showing a local part of the first patterning unit 21. The first light deflecting portion 23 is provided at the local part of the first patterning unit 21. It should be noted that FIG. 12 shows the view taken along a direction perpendicular to a first direction x (i.e., the direction along which the first deflecting portion 23 extends). It may show the work principle of the first light deflecting portion 23 more clearly. The cross section of the first light deflecting portion 23 has a circular arc-shaped profile. The first light deflecting portion 23 has a width denoted by d. The distance between the first surface (light incident surface) 211 of the first patterning unit 21 and a bottom of the first deflecting portion 23 on the second surface 212 is denoted by H. The incident angle of the corresponding part of the light beam emitted from the light source 10 at a position on the first surface 211 corresponding to a center of the first light deflecting portion 23 is denoted by a. The refractivity of the material of the first light deflecting portion 23 is denoted by n. In an example, the first light deflecting portion 23 may be shaped or sized to satisfy:

$$H \times \sin \alpha / n < d/2 \quad \text{(Formula 1)}$$

If the Formula 1 is satisfied, at least most of light incident at the position on the first surface 211 corresponding to the first light deflecting portion 23 can exit from the first light deflecting portion 23. In this way, the first light deflecting portion 23 is bright if it is observed from the front of the first light deflecting portion 23, in other words, the region corresponding to the first light deflecting portion 23 is lit. If all of the first light deflecting portions 23 on the first patterning unit 21 satisfy the Formula 1, the first patterning unit 21 will show a pattern with uniform bright lines. However, in embodiments of the present disclosure, it is not intended to limit all of the first deflecting portions 23 must satisfy the Formula 1. For example, parts of the light beam emitted from the light source 10 may have different incident angles at different positions on the first surface 211. In this way, when the incident angle of the part of the light beam becomes very large, the corresponding first light deflecting portion 23 may not satisfy the Formula 1 any longer. At that time, the intensity of the light emitted from the first light deflecting portion 23 will be reduced to form dark regions in the pattern. In other examples, the size of the first light deflecting portion 23 may alternatively be adjusted as required to obtain different bright and dark regions.

As an example, the width d of each first light deflecting portion 23 may be:

$$d = 2 \times H \times \arcsin(n \times \sin(\arctan(H(n-1))/2r)) \quad \text{(Formula 2)}$$

where r is radius of curvature of the circular arc-shaped profile of the first light deflecting portion 23.

As an example, the width d of the first light deflecting portion 23 may be less than 5 mm, preferably less than 0.15 mm, for example may be greater than 0.01 mm and less than 0.15 mm, or greater than 0.05 mm and less than 0.15 mm, or greater than 0.1 mm and less than 0.15 mm. As an example, the distance H between the first surface 211 and the bottom of the first deflecting portion 23 on the second surface 212 may range from 0.1 mm to 5 mm, for example less than 0.3 mm, such as 0.237 mm.

In the above embodiments, the cross section of the first light deflecting portion 23 (the section taken in a direction perpendicular to the direction in which the first light deflecting portion 23 extends) has the circular arc-shaped profile. However, embodiments of the present disclosure are not limited to this. The cross section of the first light deflecting portion 23 may alternatively have any other shapes of profile, for example, may have a triangular profile, as shown in FIG. 7.

The skilled person in the art should understand that the principles of the second light deflecting portion 24 as well as a third light deflecting portion 27 and a four light deflecting portion 28 to be described below are substantially the same as that of the above first light deflecting portion 23. The specific details of the principles will be not repeatedly described here.

In an example, an extending direction x of the plurality of first light deflecting portions 23 is arranged such that a first pattern part 31 is formed, by the plurality of first light deflecting portions 23, in the cross section of the first light beam 11 and an extending direction y of the plurality of second light deflecting portions 24 is arranged such that a second pattern part 32 is formed, by the plurality of second light deflecting portions 24, in the cross section of the second light beam 12. The first pattern part 11 and the second pattern part 12 are combined into a first indicating pattern as shown in FIG. 8. The first light deflecting portions 23 and the second light deflecting portions 24 that extend along different directions from each other are combined to form an indicating pattern. In this way, more diverse indicating patterns can be formed.

Figure 4:
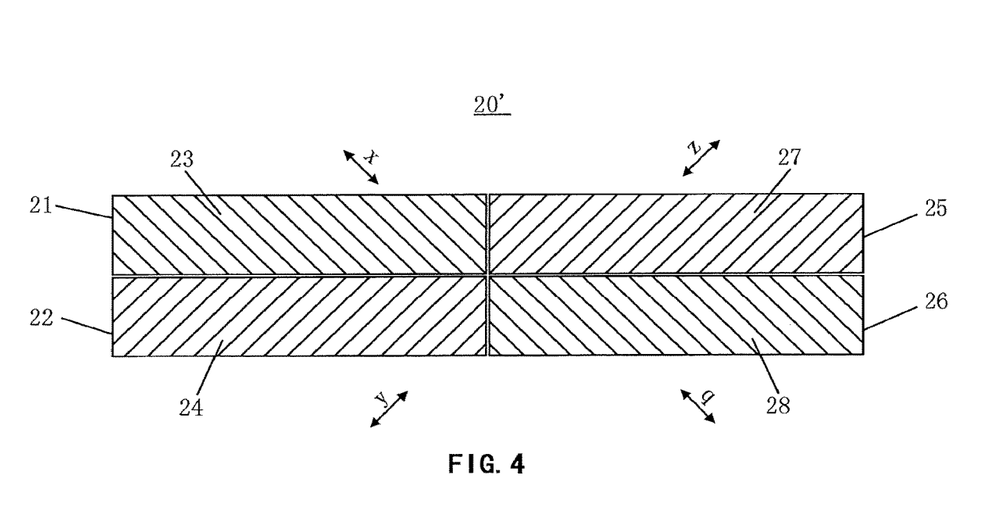
FIG. 4 shows a schematic view of another example of a patterning device in an optical indicating device according to a further embodiment of the present disclosure.

In embodiments of the present disclosure, the number of the patterning units in the patterning device is not limited to two. In an example, as shown in FIG. 4, a patterning device 20' may further include a third patterning unit 25 and a fourth patterning unit 26, besides the first patterning unit 21 and the second patterning unit 22 as described above. The third patterning unit 25 includes a plurality of third light deflecting portions 27 extending in parallel with one another and in a third direction z. The third direction z is different from the first direction x. The fourth patterning unit 26 may include a plurality of fourth light deflecting portions 28 extending in parallel with one another and in a fourth direction q. The fourth direction q is different from the second direction y. As an example, the third direction z may be the same as the second direction y, or may alternatively be different from the second direction y. Similarly, the fourth direction q may be the same as the first direction x, or may alternatively be different from the first direction x. More patterning units can be arranged in the patterning device 20'. They may be configured to form more indicating patterns.

Figure 5:
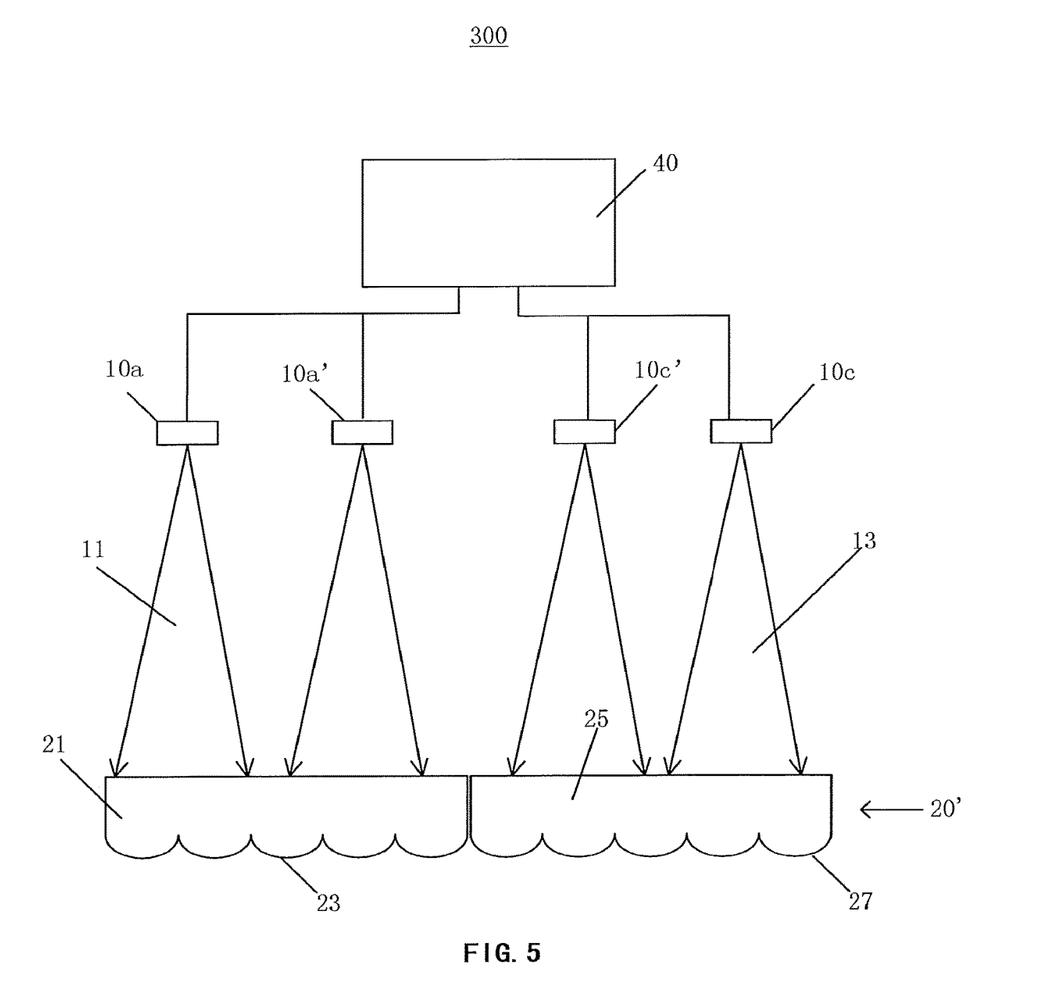
FIG. 5 shows a schematic view of an optical indicating device according to a further embodiment of the present disclosure.

FIG. 5 shows a schematic view of the optical indicating device according to a further embodiment of the present disclosure, in which the patterning device 20' shown in FIG. 4 is used. FIG. 5 only shows the first patterning unit 21 and the third patterning unit 25. The second patterning unit 22 and the fourth patterning unit 26 are not shown due to being blocked by the first patterning unit 21 and the third patterning unit 25. In this embodiment, the first patterning unit 21 receives light beams from two light sources 10a, 10a', instead of the light beam from only one light source. It may be used to form a plurality of indicating patterns. In the embodiments of the present disclosure, the number of the light beams incident on the first patterning unit 21 is not limited to this. The first patterning unit 21 may receive the light beam from any number of light sources to form various indicating patterns. Also, in the embodiments of the present disclosure, the second patterning unit 22, the third patterning unit 25 and the fourth patterning unit 26 each can receive the light beam from any number of light sources to form various indicating patterns. For example, FIG. 5 shows that the third patterning unit 25 receives light beams from two light sources 10c and 10c'. In embodiments of the present disclosure, the light source may be located, for example, at an adjoining position between the first patterning unit 21 and the second patterning unit 22, or may be alternatively arranged at a middle position of any patterning unit. Or, the light source may alternatively be arranged at other positions as long as the light beam emitted from the light source can be directed to a desired patterning unit so as to form the indicating patterns.

Figure 10:
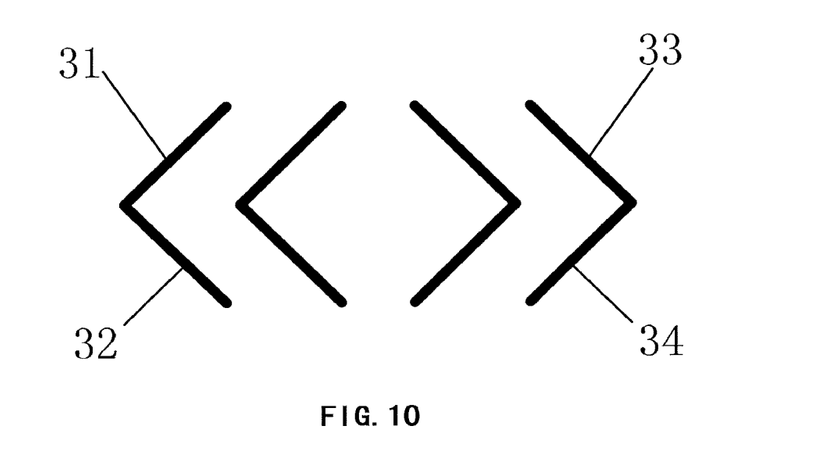
FIG. 10 shows a schematic view of a further example of an indicating pattern outputted by an optical indicating device according to an embodiment of the present disclosure.
Figure 11:
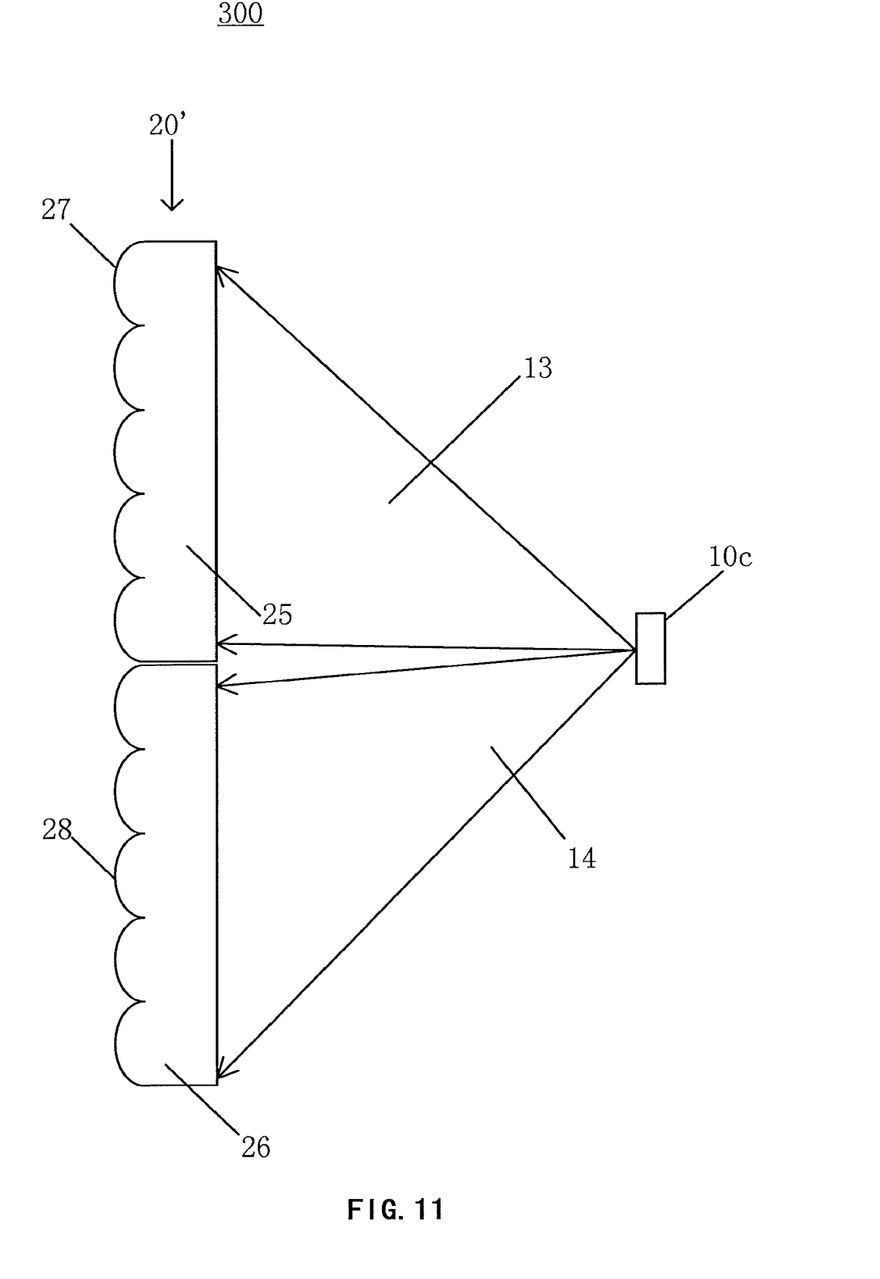
FIG. 11 shows a side schematic view of the optical indicating device shown in FIG. 5.

FIG. 11 shows a (right) side schematic view of the optical indicating device 300 shown in FIG. 5, and shows the third patterning unit 25 and the fourth patterning unit 26. FIG. 10 schematically shows the indicating patterns formed by the optical indicating device 300. Similar to the case shown in FIG. 1, in the optical indicating device 300, as shown in FIG. 11, the light source 10c may be configured to emit a third light beam 13 and a fourth light beam 14. The extending direction of the plurality of third light deflecting portions 27 are arranged such that a third pattern part 33 (see FIG. 10) is formed, by the plurality of third light deflecting portions 27, in the cross section of the third light beam 13. The extending direction of the plurality of fourth light deflecting portions 28 is arranged such that a fourth pattern part 34 (see FIG. 10) is formed, by the plurality of fourth light deflecting portions 28, in the cross section of the fourth light beam 14. The third pattern part 33 and the fourth pattern part 34 are combined into a second indicating pattern. The second indicating pattern may be arranged to represent different information than the first indicating pattern. As shown in FIG. 10, the first indicating pattern (the pattern at the left part in FIG. 10) may be used to indicate the arrow pointing to the left while the second indicating pattern (the pattern at the right part in FIG. 10) may be used to indicate the arrow pointing to the right. Different indicating patterns can be selected to display by controlling on and off of the light source suitably. Similar to the first light beam 11 and the second light beam 12, the third light beam 13 and the fourth light beam 14 may also be emitted from the same light source or from different light sources.

As an example, the first direction x may be at an angle in a range from 60 degrees to 120 degrees with respect to the second direction y. It may achieve a better display effect for the first indicating pattern. In practice, the first direction x and the second direction y may be inclined with respect to the vertical direction, so as to form desired indicating patterns.

In embodiments of the present disclosure, the at least one light source 10 may include one or more light emitting diodes or halogen lamps. When a plurality of light emitting diodes or halogen lamps are used, the indicating patterns can be displayed more flexibly.

As an example, the optical indicating devices 100, 100', 200, 300 according to embodiments of the present disclosure may further include a pattern adjusting device 40 configured to control on and off of respective light sources so as to change the indicating patterns (such as the first indicating pattern or the second indicating pattern) outputted by the patterning device 20 or 20', for example, to dynamically change the indicating patterns outputted by the patterning device 20 or 20'. In the case that the optical indicating device includes a plurality of light sources 10, different parts in the indicating pattern are often associated with different light sources (such as light emitting diodes or halogen lamps) respectively. Thus, the indicating patterns outputted by the patterning device 20 or 20' may be changed by turning on or turning off some of the light sources, so that the patterns can be varied dynamically, even in real time. The dynamical variation of the indicating patterns itself may also be used as an indicating information, such as display alarming information.

As an example, as shown in FIG. 5, the pattern adjusting device 40 is configured to be connected electrically to the respective light sources, so as to control them. The pattern adjusting device 40 may include a driving circuit for controlling a driving current passing through the at least one light source (such as light emitting diode or halogen lamp). Any driving circuits known in the art for driving the light source such as the light emitting diode or halogen lamp to turn on or turn off are also applicable, and specific details thereof will be omitted.

Figure 9:
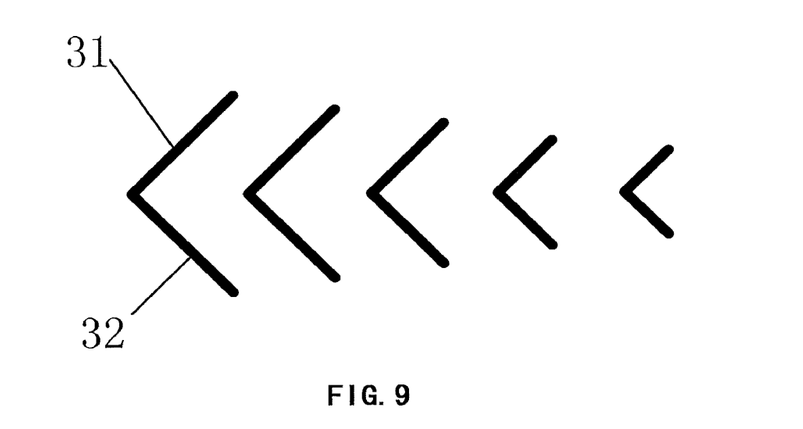
FIG. 9 shows a schematic view of another example of an indicating pattern outputted by an optical indicating device according to an embodiment of the present disclosure.

In an example, in case that the optical indicating device includes two or more light sources, a distance between at least one of the two or more light sources and the patterning device 20 or 20' is different from the distance between another one of the two or more light sources and the patterning device 20 or 20'. Such difference in distance may also function to change the indicating patterns. For example, as shown in FIG. 9, sizes of five fold lines in the indicating pattern decrease gradually from left to right. It may be achieved by the above difference in distance. The displayed size of the indicating pattern increases as the distance between the light source and the patterning device 20 or 20' increases. For example, if the distance between the plurality of light sources and the patterning device 20 or 20' increases gradually from left to right, the display effect of the indicating pattern shown in FIG. 9 will be achieved.

For the sake of clarity, in FIG. 8 to FIG. 10, bright lines in the indicating patterns are indicated by black bold lines and background colors of the indicating patterns are not shown. In practice, the bright lines in the indicating pattern may have any colors.

Figure 13:
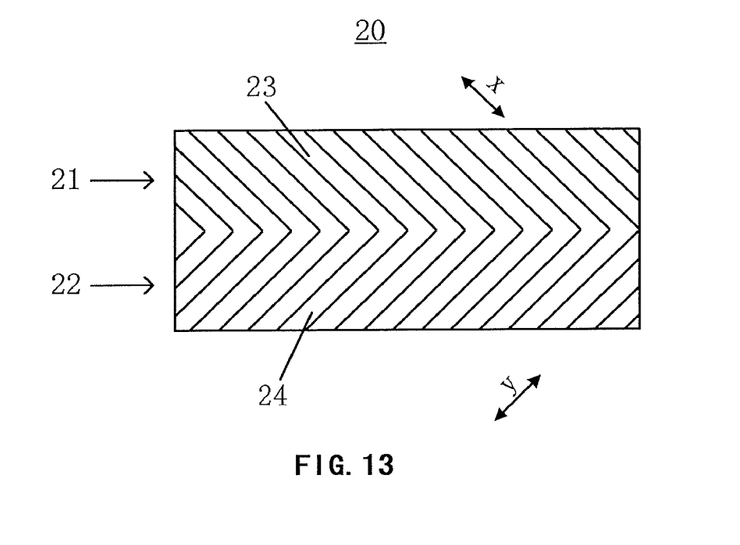
FIG. 13 shows a schematic view of another example of a patterning device in an optical indicating device according to an embodiment of the present disclosure, where a first patterning unit and a second patterning unit are integrally formed.

In embodiments of the present disclosure, the first patterning unit 21 and the second patterning unit 22 may be separated from each other, or may be integrated in a one-piece, as shown in FIG. 13. Similarly, the third patterning unit 25 and the fourth patterning unit 26 may also be integrated with the first patterning unit 21 and the second patterning unit 22, or may be formed separately and respectively. As an example, the patterning device 20 or 20' may be made by a single piece, for example, it may be made into a single plate-shaped member. It is advantageous for simplifying the process and enhancing optical efficiency. For example, the patterning device 20 or 20' may be made from a transparent glass, resin or plastic material, such as PMMA (polymethyl methacrylate). The reflectivity of the light deflecting portions (such as the first light deflecting portion 23, the second light deflecting portion 24, the third light deflecting portion 27 and the fourth light deflecting portion 28) may for example be in a range from 1.3 to 2.0.

As an example, any one of the first patterning unit 21, the second patterning unit 22, the third patterning unit 25 and the fourth patterning unit 26 may be formed by a grating. In this case, each of the light deflecting portions (such as the first light deflecting portion 23, the second light deflecting portion 24, the third light deflecting portion 27 and the fourth light deflecting portion 28) may correspond to or used as one grating unit. The grating may have a pitch equal to the width of the light deflecting portion. Forming the patterning unit (such as the first patterning unit 21, the second patterning unit 22, the third patterning unit 25 and the fourth patterning unit 26) by the grating can simplify the manufacturing process and system structure. It should be noted that a grating is typically used for diffraction in an optical system; however, in embodiments of the present disclosure, the diffraction effect is not prominent. In particular, when the width d of the light deflecting portion (for example greater than 0.1 mm) is significantly greater than visible light wavelengths, the light deflecting portion achieves the display of the indicating patterns mainly by refraction. It is significantly different from the typical application of the grating in the prior art.

As an example, the distance between the light source 10 and the patterning device 20 or 20' may for example range from 5 mm to 200 mm. Any one of the first patterning unit 21, the second patterning unit 22, the third patterning unit 25 and the fourth patterning unit 26 as described above may for example have a thickness from 5 mm to 200 mm.

In an example, the light source 10 has a light emitting angle greater than 30 degrees in a plane (i.e., in the plane in which the paper page in FIG. 1 is located) perpendicular to a central axis of the first light beam 40 and to the first surface 211 of the first patterning unit 21. Relatively large light emitting angle is advantageous for increasing the difference in distance between the light source 10 and the respective first patterning unit 21, so as to obtain significant three dimensional display effects.

As an example, the light source 10 may include a white light emitting diode or a monochromatic light emitting diode. When the width d of the light deflecting portion (such as the first light deflecting portion 23, the second light deflecting portion 24, the third light deflecting portion 27 or the fourth light deflecting portion 28) is significantly greater than visible light wavelengths, for example greater than 0.1 mm, the light deflecting portion has no significant effect of color separation for the white light without affecting the visual effects of the exiting light. Thus, a white light emitting diode may be used as the light source 10. The light source may include one light emitting diode, or an array of light emitting diodes. The light source 10 may be supported by any members known in the art for carrying the light source, such as a lamp mount, a printed circuit board, or the like.

An embodiment of the present disclosure also provides a vehicle lamp including the indicating device 100, 100', 200 or 300 as described in any one of the above embodiments of the present disclosure. The light beam emitted from the patterning device 20 or 20' may be used to form lighting and/or signaling light for the vehicle lamp to improve visual effects.

In embodiments of the present disclosure, the patterning device 20 or 20' may be supported or suspended by any known suitable means for holding optical elements, such as a support, a boom, etc.

The vehicle lamp according to the embodiments of the present disclosure may include any types of illumination lamp and/or signal lamp for a motor vehicle, for example, a headlamp, a center high mount stop lamp, a turn signal lamp, a position lamp, a rear stop lamp, a compartment interior lamp or the like.

An embodiment of the present disclosure also provides a motor vehicle, including the optical indicating device 100, 100', 200, 300 or the vehicle lamp as described in any one of the above embodiments of the present disclosure.

While the present disclosure has been described in connection with the accompanying drawings, embodiments disclosed in the drawings are intended to illustrate the exemplified embodiments of the disclosure and are not to be construed as limiting the invention. The scales in the drawings are merely illustrative and are not to be construed as limiting the invention.

While some embodiments of the general inventive concept of present disclosure have been shown and described, those skilled in the art will appreciate that changes may be made to these embodiments without departing from the principles and spirit of the general inventive concept of the present invention. The scope of the present invention is defined by the appended claims and their equivalents.

What is claimed is:

1. An optical indicating device, comprising:
at least one light source; and
a patterning device arranged to form an indicating pattern when a light beam emitted from the light source is transmitted through the patterning device; wherein
the patterning device comprises at least one patterning unit arranged to pattern the light beam, and a plurality of light deflecting portions arranged adjacent to each other are formed on a side of the at least one patterning unit facing towards the light source or facing away from the light source,
the indicating pattern of the transmitted light beam is a pattern of dark regions and bright regions that is observed on the patterning device when viewing the patterning device from the side of the at least one patterning unit facing away from the light source, and
the at least one light source is configured to change the indicating pattern between a first indicating pattern and a second indicating pattern, which is different from the first indicating pattern.

2. The optical indicating device according to claim 1, wherein the light deflecting portions have cross sections with circular arc-shaped profiles or triangular profiles.

3. The optical indicating device according to claim 1, wherein the light deflecting portions have widths less than 5 mm and greater than 0.01 mm.

4. The optical indicating device according to claim 3, wherein the light deflecting portions have widths less than 5 mm and greater than 0.1 mm.

5. The optical indicating device according to claim 1, wherein the light deflecting portions of the at least one patterning unit extend in different directions.

6. The optical indicating device according to claim 5, wherein the at least one patterning unit is combinable with each other.

7. The optical indicating device according to claim 1, wherein a distance between the light source and the at least one patterning unit is adjustable, and changing the indicating pattern is performed by adjusting the distance between the light source and the at least one patterning unit.

8. The optical indicating device according to claim 1, further comprising a pattern adjusting device configured to control on and off of the at least one light source so as to change the indicating pattern outputted by the patterning device.

9. The optical indicating device according to claim 8, wherein the pattern adjusting device comprises a driving circuit configured to control a driving current passing through the at least one light source.

10. The optical indicating device according to claim 1, wherein the light source includes a light emitting diode or a halogen lamp.

11. The optical indicating device according to claim 1, wherein the at least one patterning unit is formed by a grating.

12. A vehicle lamp comprising the optical indicating device according to claim 1.

13. A motor vehicle, comprising the indicating device according to claim 1.

14. The optical indicating device according to claim 2, wherein the light deflecting portions have widths less than 5 mm and greater than 0.01 mm.

15. The optical indicating device according to claim 2, wherein the light deflecting portions of the at least one patterning unit extend in different directions.

16. The optical indicating device according to claim 2, wherein a distance between the light source and the at least one patterning unit is adjustable, and changing the indicating pattern is performed by adjusting the distance between the light source and the at least one patterning unit.

17. A motor vehicle, comprising the vehicle lamp according to claim 12.

18. A vehicle lamp comprising the optical indicating device according to claim 2.

19. A vehicle lamp comprising the optical indicating device according to claim 3.

20. A vehicle lamp comprising the optical indicating device according to claim 4.

* * * * *